(12) United States Patent
Lion et al.

(10) Patent No.: US 9,655,476 B2
(45) Date of Patent: May 23, 2017

(54) DEVICE FOR HOLDING KITCHEN UTENSILS, ESPECIALLY KNIVES

(71) Applicant: MASTRAD, S.A., Paris (FR)

(72) Inventors: Mathieu Lion, Paris (FR); Lucas Bignon, Chambord (FR)

(73) Assignee: MASTRAD, S.A., Paris (FR)

( * ) Notice: Subject to any disclaimer, the term of this patent is extended or adjusted under 35 U.S.C. 154(b) by 0 days.

(21) Appl. No.: 14/767,879

(22) PCT Filed: Feb. 12, 2014

(86) PCT No.: PCT/FR2014/050266
§ 371 (c)(1),
(2) Date: Aug. 13, 2015

(87) PCT Pub. No.: WO2014/125208
PCT Pub. Date: Aug. 21, 2014

(65) Prior Publication Data
US 2015/0366407 A1 Dec. 24, 2015

(30) Foreign Application Priority Data

Feb. 14, 2013 (FR) ..................................... 13 51272

(51) Int. Cl.
*A47J 47/16* (2006.01)

(52) U.S. Cl.
CPC .................................... *A47J 47/16* (2013.01)

(58) Field of Classification Search
CPC .......... A47G 21/14; A47J 47/16; A47B 77/14; B65D 81/38; B65D 25/16; B65D 25/18; B31B 5/26
USPC ............ 220/608, 604, 739, 737, 735, 23.86, 220/23.83; 211/70.7; 206/349; 493/310, 493/309, 299, 257, 255, 243, 186
See application file for complete search history.

(56) References Cited

FOREIGN PATENT DOCUMENTS

DE 20 2011 050105 6/2011
GB 2382298 5/2003

OTHER PUBLICATIONS

International Search Report dated Apr. 14, 2014, PCT/FR2014/050266—Feb. 12, 2014.

*Primary Examiner* — Robert J Hicks
(74) *Attorney, Agent, or Firm* — Karish & Bjorgum, PC

(57) ABSTRACT

The invention relates to a device comprising a holder (12) and at least one flexible sheet (14) maintained in a curved configuration by the holder in order to define at least two adjacent sheet portions, having parallel generatrices and defining therebetween at least one gap (16) with a curved section that can exert a self-flexibility function of the sheet. The invention is applicable to kitchen accessories.

18 Claims, 4 Drawing Sheets

Fig.4
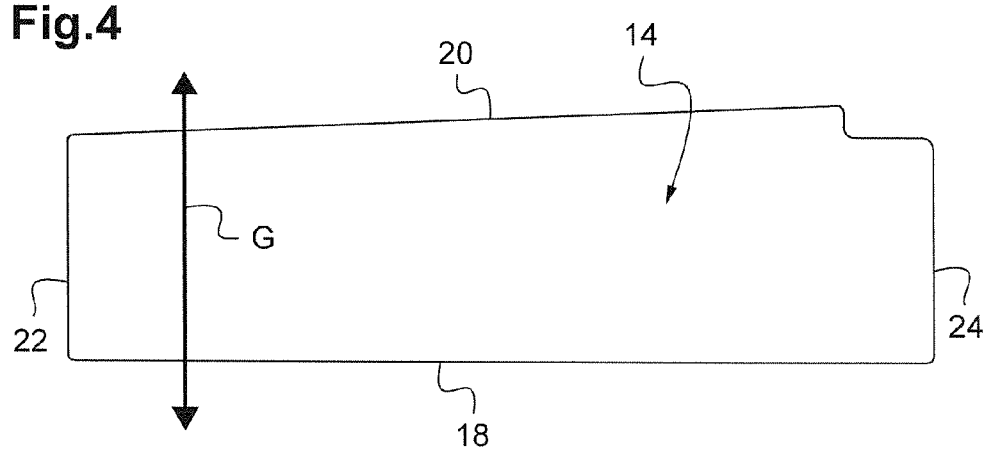
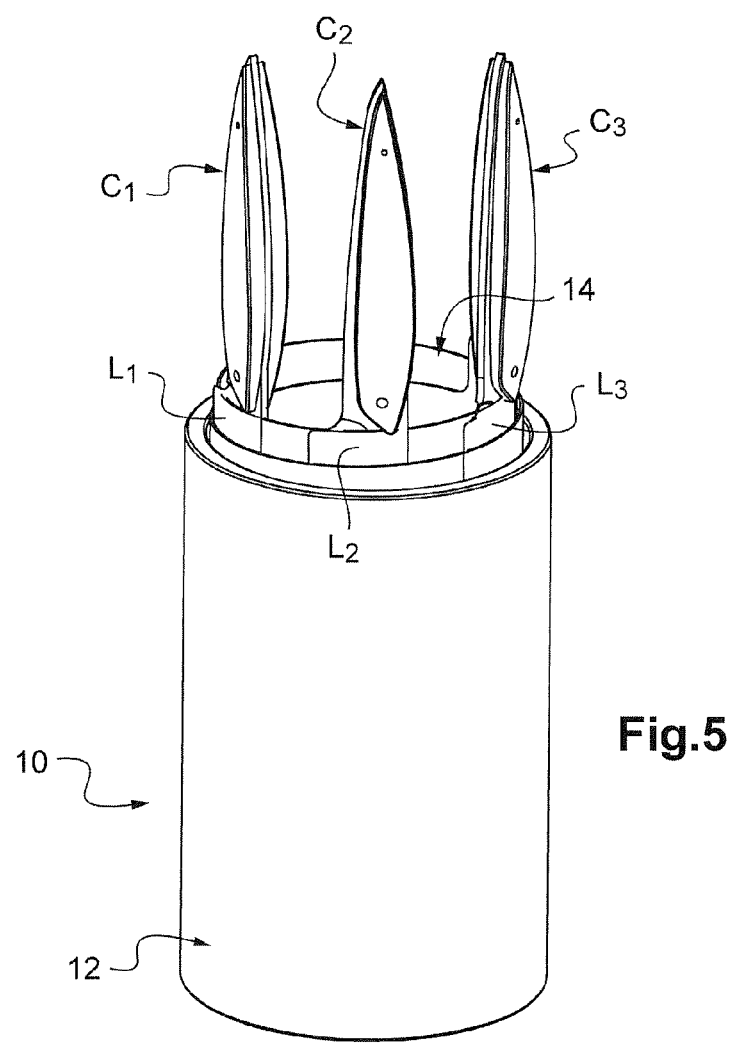
Fig.5

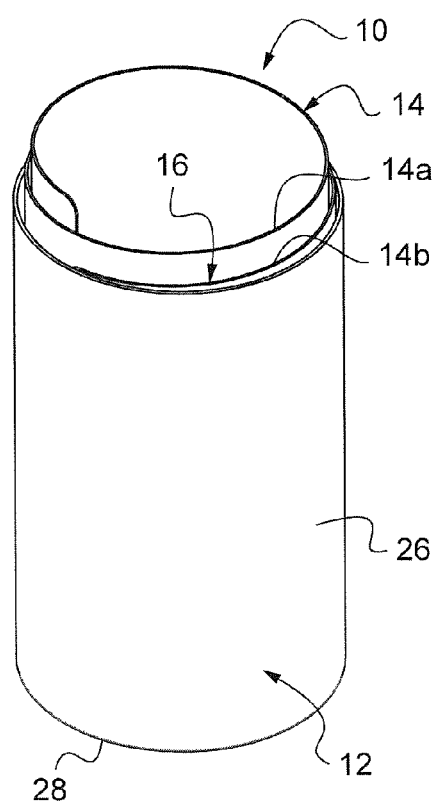
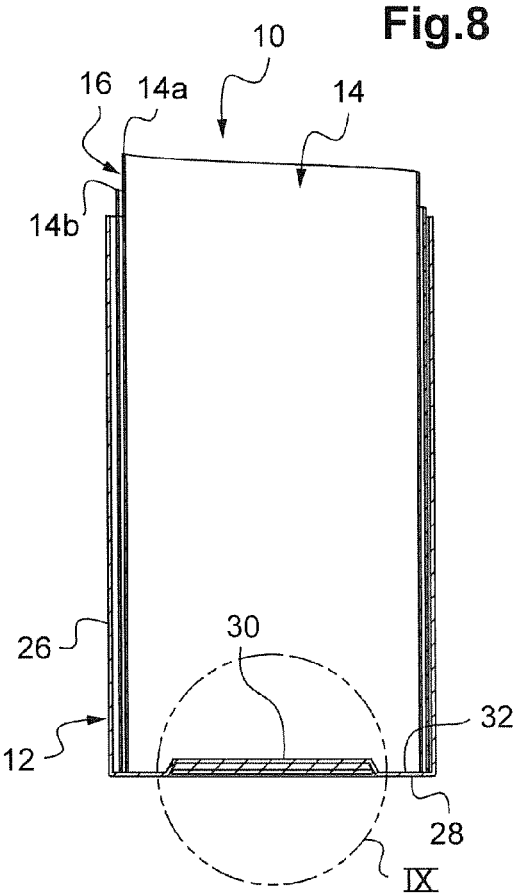
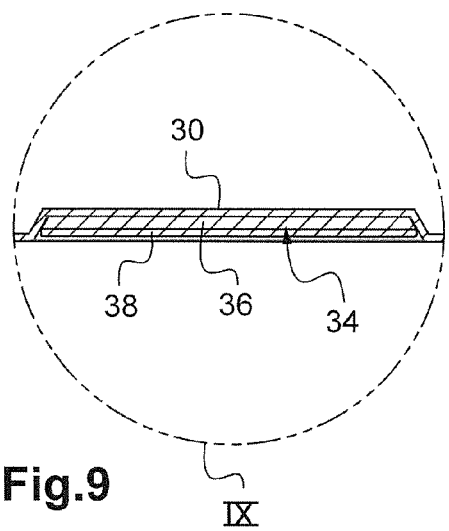
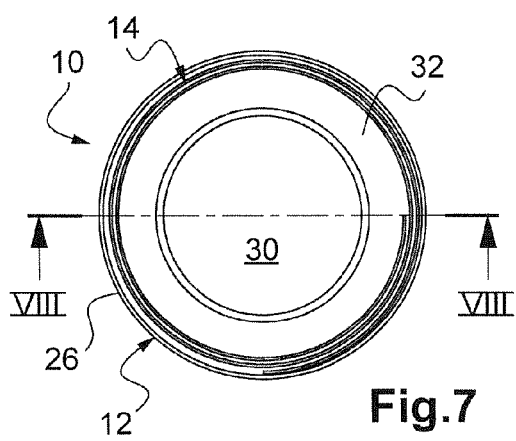

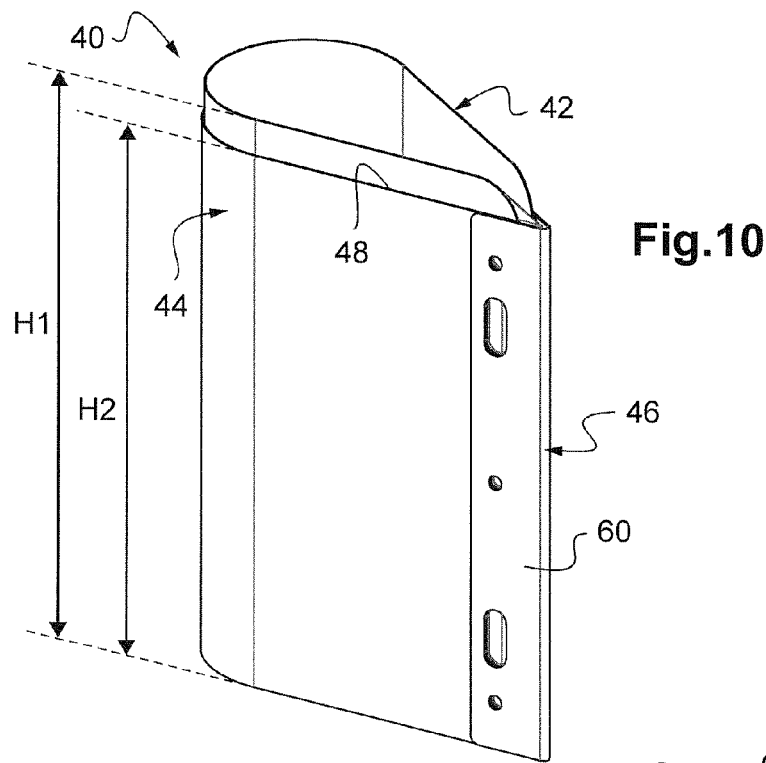
Fig.10
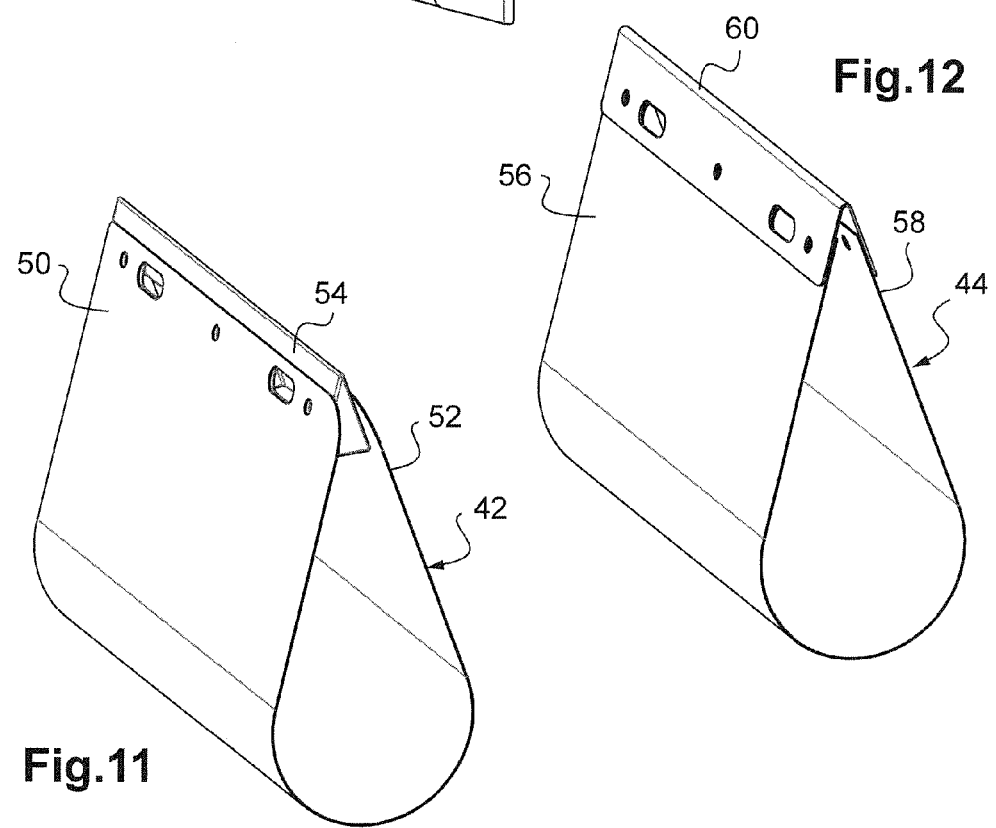
Fig.11
Fig.12

DEVICE FOR HOLDING KITCHEN UTENSILS, ESPECIALLY KNIVES

BACKGROUND OF THE INVENTION

Field of the Invention

The invention relates to kitchen accessories and utensils.

It relates more particularly to a device for holding kitchen utensils, especially knives.

Description of Related Art

There already exist many types of devices of this kind, which are often similar to racks in which the utensils are placed.

When such devices are to hold knives, the knives are generally placed in a vertical position, the blade being oriented downwards and passing through an opening of a suitable shape, the knife then being held by the handle of the knife coming into abutment with the holder.

Other types of devices are also known, in which there are provided generally horizontal spindles for receiving the knives, the handles of which are each provided with an appropriate opening.

There are also other holding devices in which the knives are disposed horizontally, the blades thereof being inserted into appropriate slots.

Also known are holding devices having a magnetized plate for holding the knives by means of their blades by magnetic attraction.

These known devices can present risks for the users, for example when the blades of the knives are not positioned correctly.

In most cases, these known devices are designed for utensils, in particular knives, of suitable shapes and sizes.

Furthermore, these known devices are in most cases difficult to clean, which can give rise to hygiene problems.

BRIEF SUMMARY OF THE INVENTION

The object of the invention is especially to overcome the above-mentioned disadvantages.

The invention aims in particular to provide a holding device of the type defined above which can be used under optimum safety conditions for the user, and which is also easy to clean.

The invention aims also to propose such a holding device which is able to adapt automatically to the shapes and sizes of different utensils, and in particular to those of knives which are to be held.

To that end, the invention proposes a device for holding kitchen utensils, especially knives, which comprises a holder and at least one flexible sheet which is maintained in a curved configuration by the holder in order to define at least two adjacent sheet portions which have parallel generatrixes and delimit between them at least one slot of curved cross-section which is capable of receiving part of a utensil, in particular a knife blade, and of exerting a self-gripping function on the utensil part owing to the flexibility of the sheet.

Accordingly, the utensil, especially the knife, is held in position by a self-gripping effect of one or more flexible sheets which are maintained in a curved configuration by an appropriate holder.

The flexible sheet or sheets allow a slot of curved cross-section to be defined, which slot is capable of deforming owing to its or their flexibility and of adapting to the shape of the utensil, in particular of the knife blade.

The expression "flexible sheet" is here intended to denote a sheet with resilient deformation which is capable of forming, either on its own or in combination with another sheet of the same type, a narrow slot which is capable of spreading or widening when part of a utensil is introduced, in order to exert a gripping force on the utensil part.

Owing to the flexibility of the sheet, or, where appropriate, of the sheets, the utensil is held gripped in position, the slot being deformed and automatically adapting to the shape of the utensil.

It thus exerts a self-gripping function, which allows the utensil to be held under optimum safety conditions.

Furthermore, because the device uses a flexible sheet or a plurality of flexible sheets, they can easily be cleaned for hygiene purposes.

In one embodiment of the invention, the device comprises a single wound flexible sheet which is maintained by the holder in a configuration in which it is wound on itself in a spiral according to at least two revolutions in order to define a slot of substantially circular cross-section.

In this case, the holder is advantageously designed to delimit a housing of generally circular cylindrical shape which is suitable for receiving in a removable manner the flexible sheet wound in a spiral.

In another embodiment of the invention, the device comprises at least two flexible sheets which are maintained by the holder in homologous curved configurations and delimit between them at least one slot.

Accordingly, this device can comprise an inner flexible sheet and an outer flexible sheet surrounding the inner flexible sheet and delimiting between them a slot.

In one embodiment, the inner flexible sheet and the outer flexible sheet each have a profile of the "droplet" type and are joined by common sides in the direction of the generatrixes.

BRIEF DESCRIPTION OF THE DRAWINGS

In the following description, which is given solely by way of example, reference is made to the accompanying drawings, in which:

FIG. 4 shows the sheet of the device of FIGS. 1 to 3 in a configuration in which it is unwound flat;

FIG. 5 is a perspective view of the device of FIGS. 1 to 3 in which a knife has been placed in the vertical position;

FIG. 6 is a perspective view of a device according to a variant of FIGS. 1 to 3;

FIG. 7 is a top view of the device of FIG. 6;

FIG. 8 is a sectional view along the line VIII-VIII of FIG. 7;

FIG. 9 shows detail IX of FIG. 8 on an enlarged scale;

FIG. 10 is a perspective view of a device according to a second embodiment of the invention, comprising two flexible sheets of homologous shapes;

FIG. 11 is a perspective view of one of the flexible sheets of the device of FIG. 10, maintained in a closed configuration by an element of the holder; and FIG. 12 is a perspective view of the other flexible sheet of the device of FIG. 10, maintained in a closed configuration by another element of the holder.

DETAILED DESCRIPTION OF THE INVENTION

Figure 1:
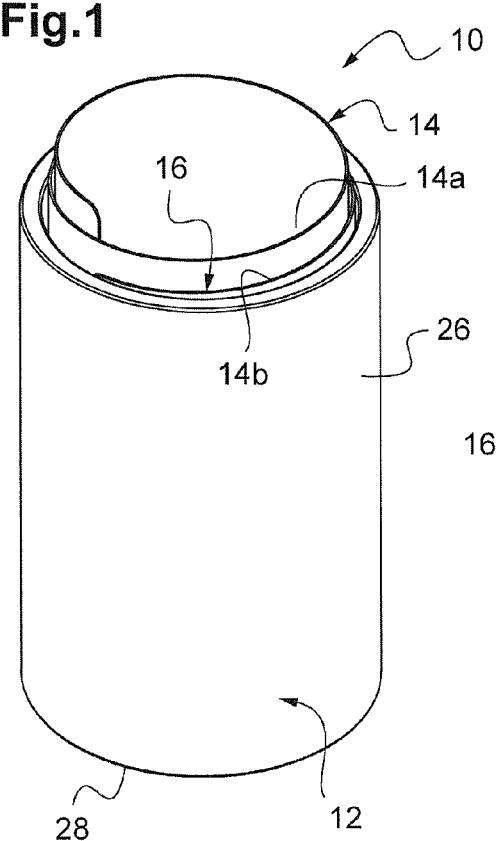
FIG. 1 is a perspective view of a device in a first embodiment of the invention, comprising a single flexible sheet wound in a spiral.

Reference will first be made to FIG. 1, which shows a device 10 for holding kitchen utensils, especially knives. The device comprises a holder 12 and at least one flexible sheet 14 maintained in a curved configuration by the holder.

The holder 12 delimits an internal housing of generally circular cylindrical shape, which housing is open at one of its ends and is suitable for receiving, in a removable manner, the flexible sheet 14 wound in a spiral. The flexible sheet is wound in a spiral on itself over at least two circumferential revolutions or turns (FIG. 2) in order to define at least two adjacent sheet portions 14a and 14b which have parallel generatrixes, in the example vertical generatrixes, and which delimit between them at least one slot 16 of curved cross-section.

The slot 16 is here of substantially circular, more precisely spiral, cross-section because it is delimited by the spiral shape of the sheet 14. The slot is narrow owing to the fact that the adjacent sheet portions 14a and 14b tend to move together in the manner of a helical spring which is held inside a cylindrical wall. The slot 16 is to receive part of a utensil, in particular a knife blade, as will be described hereinbelow, and to exert a self-gripping function on the utensil part as a result of the flexibility and resilience of the sheet.

As can be seen in FIG. 1, the sheet is held in the housing of the holder and tends to unwind and thus exert a gripping function in the radial direction and against the holder.

Since the flexible sheet is wound in a spiral in at least two revolutions, this allows the slot 16 of substantially circular cross-section to be defined, into which slot it will be possible to insert the knife blade or blades to be held.

As can be seen in FIG. 4, the flexible sheet 14 has, in a planar configuration, an elongate shape delimited by a first, generally straight long side 18, a second long side 20 opposite the first side, a first short side 22 and a second short side 24, both of which join the first long side and the second long side.

When the flexible sheet is in the wound configuration, the first long side 18 and the second long side 20 are at the bottom portion and at the top portion, respectively, of the flexible sheet, while the first short sides 22 and the second short sides 24 extend substantially in the direction of the generatrixes G (FIG. 4) of the wound sheet, in a vertical direction in the example.

As can be seen in FIG. 4, when the flexible sheet is in the planar configuration, the second long side 20 is not parallel to the first long side 18, so that the flexible sheet has a variable height in its wound configuration.

Thus, as can be seen in FIG. 1, the entry of the slot 16 is better visible to the user, the adjacent sheet portions 14a and 14b being offset in terms of height.

Figure 3:
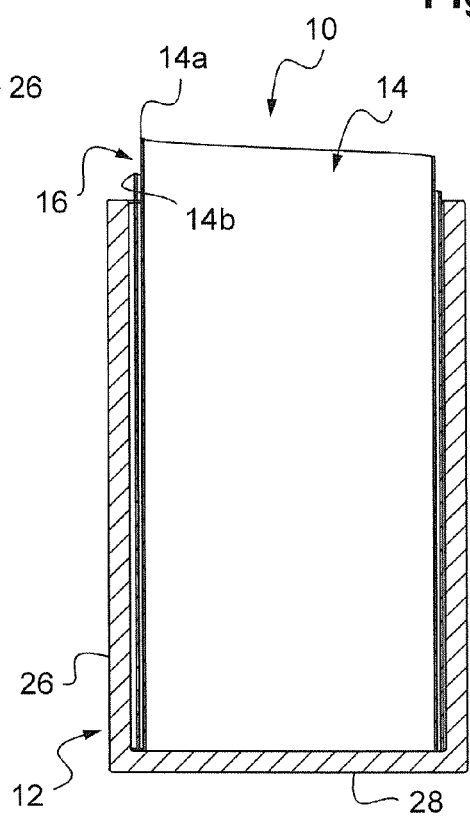
FIG. 3 is a sectional view along the line III-III of FIG. 2.
Figure 2:
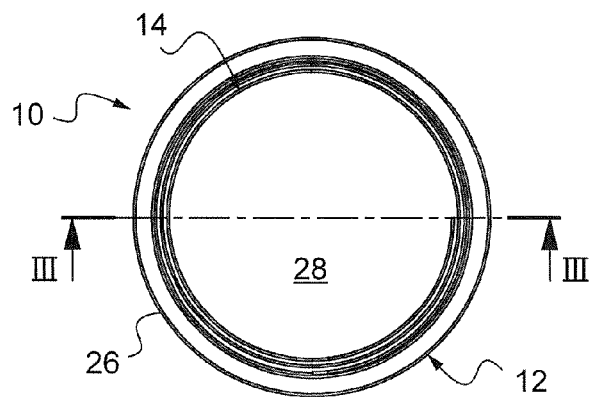
FIG. 2 is a top view of the device of FIG. 1.

In the example shown in FIGS. 1 to 3, the holder 12 is to be placed vertically on a support surface, for example on a working surface of a kitchen, so that the generatrixes of the sheet 14 in the wound configuration are directed vertically. In the example, the holder 12 comprises at least one annular wall 26 of circular cylindrical shape attached to a base wall 28 of generally circular shape.

Here, the holder comprises a single annular wall 26 which is formed in one piece with the base wall 28. By way of variation, the base wall 28 could be separate from the annular wall. In the example, the annular wall 26 which forms the side wall of the holder is continuous and extends over virtually the entire height of the device. By way of variation, it could be perforated or formed of a plurality of segments or rings which are superposed vertically and held together, in order to make the utensils contained in the device more visible.

The holder 12 thus delimits a cylindrical housing which is open at the top, that is to say on the side opposite the base wall 28, in order to allow the flexible sheet 14, which has previously been wound on itself in a spiral, to be introduced into the receiver in a removable manner. Once the flexible sheet has been introduced into the receiver of the holder, it tends to unwind and radially hug the inside of the annular wall 26, narrowing the slot 16.

In the example shown, the annular wall 26 and the base wall 28 are made of a wood-based material, for example bamboo.

FIG. 5 shows how the device 10 here receives three knives C1, C2, and C3, the blades L1, L2 and L3 of which are introduced into the slot 16 delimited by the flexible sheet 14. Since the blades have a straight profile and are in each case positioned between two sheet portions 14a and 14b of curved cross-section, the flexible sheet will exert a self-gripping function. In order to position a knife, the point of the blade is introduced into the slot 16, between the sheet portions 14a and 14b, which move apart while gripping the blade. The introduction is continued until the handle of the knife abuts the flexible sheet 14.

As can be seen in the figures, the flexible sheet 14 can easily be removed from its holder for cleaning purposes.

It is interesting to note that the flexible sheet defines in its centre a generally cylindrical housing which is able to receive other kitchen utensils (not shown) such as spoons, forks, etc.

In the embodiment of FIGS. 1 to 5, the holder can have, for example, a height of from 10 to 50 cm and an inside diameter of from 5 to 30 cm. In its configuration unwound flat, the flexible sheet can have, for example, a length of from 70 to 200 cm and a width (height) of from 10 to 50 cm for a thickness of from 0.5 to 2 mm, typically of approximately 1 mm. These dimensions are given purely by way of information and are not intended to limit the invention.

FIGS. 6 to 8 correspond to the preceding FIGS. 1 to 3, respectively, in a variant embodiment. Elements that are in common with the preceding embodiment are designated by the same reference numerals. Here, the holder 12 is formed of a metal material, in particular stainless steel. The annular wall 26 and the base wall 28 constitute a one-piece element formed by stamping.

As can be seen in FIGS. 7 and 8, and in the detailed view of FIG. 9, the base wall 28 comprises a central portion 30 of generally circular shape, with a recess, and an annular portion 32 which surrounds the central portion. The central portion 30 thus protrudes with respect to the annular portion 32, the annular portion being designed to receive the flexible sheet wound in a spiral. In other words, the base wall 28 delimits a hollow annular portion 32 for receiving the lower portion of the wound sheet.

Because the central portion 30 has a recess, the base wall 28 thus creates a cavity 34 which is open at the bottom (FIGS. 8 and 9) and serves to receive a ballast, in this example a ballast weight 36 made of a high density material, in order to create weight and ballast the device. The cavity 34 is closed in a tight manner by a closing wall 38, which is here of circular shape, for purposes of aesthetics and cleanliness.

In the embodiment of FIGS. 1 to 5, or that of FIGS. 6 to 9, the sheet wound in a spiral is substantially the same. It is advantageously made of a plastics material having properties of flexibility and resilience.

It is possible to use especially a plastics material based on polymer, in particular of the polypropylene type, which has the advantage that it is of food grade, impact-resistant and semi-transparent.

In the example, the wound sheet has a thickness of approximately one millimetre. In view of the material used, the sheet can then easily be unwound and placed, for example, in a dishwasher for cleaning.

Reference will now be made to FIGS. 10 to 12 to describe another embodiment of the invention.

In this example, the device 40 comprises two flexible sheets 42 and 44 which are maintained by a holder 46 in homologous curved configurations and delimit between them a slot 48. The flexible sheet 42 constitutes an inner sheet, while the flexible sheet 44 constitutes an outer sheet and surrounds the inner flexible sheet. Here, the inner flexible sheet 42 and the outer flexible sheet 44 each have a profile of the "droplet" type and are joined by common sides or edges in the direction of the generatrixes.

The sheet 42 (FIG. 11) has two sides 50 and 52 which are brought together and fixed around a holding element 54 in the form of a bar of triangular cross-section.

The sheet 44 (FIG. 12) has two sides 56 and 58 which are brought together and held by a holding element 60 of the angle bracket type with a triangular cross-section. It will be appreciated that the inner sheet 42 and the holding element 54 can be inserted inside the outer sheet 44 and the holding element 60. The holding elements 54 and 60 can then be fixed together by screws, rivets or other appropriate means.

As can be seen in FIG. 10, the sheets 42 and 44 have heights, H1 and H2, which are different in the direction of the generatrixes, which makes the entry of the slot 46 more visible. Here, the height H1 of the inner sheet 42 is greater than the height H2 of the outer sheet 44.

As in the preceding case, the sheets 42 and 44 exert a self-gripping force, owing to their curved shape, on the utensils received in the holder, for example on knife blades. It is, of course, possible to use more than two flexible sheets with configurations which do not necessarily have a shape of the "droplet" type.

In the case of FIGS. 10 to 12, the holder can be placed either in a vertical position or in a horizontal position.

The invention is applicable primarily to accessories for the kitchens of individuals.

What is claimed is:

1. Device for holding kitchen utensils, characterized in that the device comprises a holder (12: 46) and at least one flexible sheet (14: 42, 44) which is maintained in a curved configuration by the holder in order to define at least two adjacent sheet portions which have parallel generatrixes and delimit between them at least one slot (16: 48) of curved cross-section which is capable of receiving part (L) of a utensil, and of exerting a self-gripping function on the utensil part owing to the flexibility of the sheet.

2. Device according to claim 1, comprising a single flexible sheet (14) which is maintained by the holder (12) in a configuration in which it is wound on itself in a spiral according to at least two revolutions, so that the slot (16) has a substantially circular cross-section.

3. Device according to claim 2, wherein the holder (12) delimits a housing of generally circular cylindrical shape which is suitable for receiving in a removable manner the flexible sheet.

4. Device according to claim 3, wherein the flexible sheet (14) has, in a planar configuration, an elongate shape delimited by a first, generally straight long side (18), a second long side (20) opposite the first side, a first short side (22) and a second short side (24), both of which join the first long side (18) and the second long side (20), and wherein, when the flexible sheet is in the wound configuration, the first long side (18) and the second long side (20) are at two opposite ends of the flexible sheet, the first short side (22) and the second short side (24) extending substantially in the direction of the generatrixes of the wound sheet.

5. Device according to claim 4, wherein, when the flexible sheet (14) is in the planar configuration, the second long side (20) is not parallel to the first long side (18), so that the flexible sheet has a variable height in its wound configuration.

6. Device according to claim 2, wherein the flexible sheet (14) has, in a planar configuration, an elongate shape delimited by a first, generally straight long side (18), a second long side (20) opposite the first side, a first short side (22) and a second short side (24), both of which join the first long side (18) and the second long side (20), and wherein, when the flexible sheet is in the wound configuration, the first long side (18) and the second long side (20) are at two opposite ends of the flexible sheet, the first short side (22) and the second short side (24) extending substantially in the direction of the generatrixes of the wound sheet.

7. Device according to claim 6, wherein, when the flexible sheet (14) is in the planar configuration, the second long side (20) is not parallel to the first long side (18), so that the flexible sheet has a variable height in its wound configuration.

8. Device according to claim 2, wherein the holder (12) comprises at least one annular wall (26) which is jointed to a base wall (28) of generally circular shape.

9. Device according to claim 8, wherein the holder (12) comprises a single annular wall (26) which is formed in one piece with the base wall (28).

10. Device according to claim 9, wherein the base wall (28) comprises a central portion (30) of generally circular shape with a recess, and an annular portion (32) which surrounds the central portion (30) for receiving the flexible sheet (14) wound in a spiral and wherein the base wall (28) creates an internal cavity (34) which serves as a housing for a ballast weight (36), the cavity (34) being closed in a tight manner by a closing wall (38).

11. Device according to claim 8, wherein the base wall (28) comprises a central portion (30) of generally circular shape with a recess, and an annular portion (32) which surrounds the central portion (30) for receiving the flexible sheet (14) wound in a spiral and wherein the base wall (28) creates an internal cavity (34) which serves as a housing for a ballast weight (36), the cavity (34) being closed in a tight manner by a closing wall (38).

12. Device according to claim 1, comprising at least two flexible sheets (42:44) which are maintained by the holder (46) in homologous curved configurations and delimit between them the at least one slot (48).

13. Device according to claim 12, comprising an inner flexible sheet (42) and an outer flexible sheet (44) surrounding the inner flexible sheet (42) and delimiting between them the slot (48).

14. Device according to claim 13, wherein the inner flexible sheet (42) and the outer flexible sheet (44) each having a 'droplet' profile and are joined by common sides (50, 52: 56, 58) in the direction of the generatrixes.

15. Device according to claim 14, wherein the inner flexible sheet (42) and the outer flexible sheet (44) have heights (H1, H2) which are different in the direction of the generatrixes, which makes the entry of the slot (46) more visible.

16. Device according claim 13, wherein the inner flexible sheet (42) and the outer flexible sheet (44) have heights (H1, H2) which are different in the direction of the generatrixes, which makes the entry of the slot (46) more visible.

17. Device according to claim 1, wherein the flexible sheet or sheets (14: 42, 44) are made of a plastics material having properties of flexibility and resilience.

18. Device according to claim 17, wherein the plastics material is based on polymer.

* * * * *